US010239282B1

(12) United States Patent
Caiazzo, Jr. et al.

(10) Patent No.: US 10,239,282 B1
(45) Date of Patent: Mar. 26, 2019

(54) VIBRATION-DAMPING LAMINATE STACK (71) Applicant: Materials Sciences Corporation, Horsham, PA (US)

(72) Inventors: Anthony A. Caiazzo, Jr., Greenville, SC (US); Anthony A. Caiazzo, Sr., Berlin, MD (US)

(73) Assignee: COUNTERVAIL PRODUCTS, LLC, Horsham, PA (US)

( * ) Notice: Subject to any disclaimer, the term of this patent is extended or adjusted under 35 U.S.C. 154(b) by 0 days.

(21) Appl. No.: 15/438,112

(22) Filed: Feb. 21, 2017

(51) Int. Cl.
B32B 5/12 (2006.01)
B32B 5/26 (2006.01)

(52) U.S. Cl.
CPC .......... B32B 5/12 (2013.01); B32B 5/26 (2013.01); B32B 2307/102 (2013.01); B32B 2307/56 (2013.01)

(58) Field of Classification Search
CPC ..... Y10T 428/31518; Y10T 428/31504; Y10T 428/31515; Y10T 428/249943; Y10T 428/24942; Y10T 428/29; F16F 9/306; B32B 5/26; B32B 5/12; B32B 2307/102
See application file for complete search history.

(56) References Cited

U.S. PATENT DOCUMENTS

| 4,532,169 | A | * | 7/1985 | Carley | B29C 53/8016 156/161 |
| 5,328,957 | A | * | 7/1994 | Sorathia | C08F 8/30 525/123 |
| 6,416,432 | B1 | | 7/2002 | Rosen et al. | |
| 6,524,692 | B1 | * | 2/2003 | Rosen | B32B 5/12 248/560 |
| 7,077,768 | B2 | | 7/2006 | Filippini | |
| 8,105,184 | B2 | | 1/2012 | Lammer et al. | |
| 8,142,382 | B2 | | 3/2012 | Vito et al. | |
| 8,297,601 | B2 | | 10/2012 | Vito et al. | |
| 8,413,262 | B2 | | 4/2013 | Vito et al. | |
| 8,545,966 | B2 | | 10/2013 | Vito et al. | |
| 9,265,999 | B2 | | 2/2016 | Vito et al. | |
| 2004/0213979 | A1 | | 10/2004 | Vito et al. | |
| 2006/0157901 | A1 | | 7/2006 | Vito et al. | |
| 2006/0168710 | A1 | | 8/2006 | Vito et al. | |
| 2007/0149079 | A1 | | 6/2007 | Vito et al. | |
| 2008/0022524 | A1 | * | 1/2008 | Schreiber | B29C 70/32 29/889.21 |
| 2008/0139722 | A1 | * | 6/2008 | Shefelbine | B82Y 30/00 524/413 |
| 2010/0133039 | A1 | * | 6/2010 | Liguore | B32B 5/26 181/294 |

(Continued)

Primary Examiner — Frank J Vineis
Assistant Examiner — Michael Zhang
(74) Attorney, Agent, or Firm — Staas & Halsey LLP (57) ABSTRACT A laminate stack composed of layers of composite material and viscoelastic material is disclosed. The composite material is made of fiber bundles bound with a polymer matrix and arranged in a continuous curve. In some of the composite layers, the fiber bundles are made of different kinds of material, called a multi-fiber spatially varying stiffness (MFSVS) composite layer. The construction of these MFSVS composite layers transfers more vibration to the viscoelastic layer than composite layers with straight fiber bundles or composite layers where all fiber bundles are made of the same material. The stack can be incorporated into a variety of objects requiring damping, including tubes, sheets, and shells.

19 Claims, 4 Drawing Sheets (56) References Cited

U.S. PATENT DOCUMENTS

2011/0091684 A1* 4/2011 Holloway ............. B29C 70/386
                                                      428/113
2012/0094789 A1   4/2012 Lammer et al.
2014/0030506 A1* 1/2014 Yu ............................ B32B 5/08
                                                      428/292.1

* cited by examiner

VIBRATION-DAMPING LAMINATE STACK

CROSS-REFERENCE TO RELATED APPLICATIONS

None.

BACKGROUND OF THE INVENTION

Damping vibration and noise through the structure of materials has broad application across numerous fields. A patent owned by the present Applicant, U.S. Pat. No. 6,524,692, discloses a material with spatially-varying stiffness (SVS). The SVS material was developed to improve vibration damping and reduction of noise. The SVS material has been incorporated into various items, including the sports racket disclosed in U.S. Pat. No. 6,416,432, also owned by the present Applicant. The Applicant has experimented with the SVS material, endeavoring to further improve its damping qualities and other pertinent characteristics.

SUMMARY OF THE INVENTION

Through experimentation, the Applicant has developed an improved noise and vibration damping laminate stack.

The laminate stack (which may also be called a structural laminate) is composed of layers of composite material and layers of viscoelastic material (VEM). Each composite layer is composed of fiber bundles arranged in a continuous curve and bound with a polymer matrix. (See below for the definition of "fiber bundle," which encompasses tows, rovings, yarns, and individual filaments.) In at least one composite layer, its fiber bundles are made of different materials. The composite layers with fiber bundles of different materials are called Multi-Fiber Spatially Varying Stiffness (MFSVS) layers. Importantly, the different materials must have differing elasticity properties to increase the spatially varying stiffness and improve damping over the SVS or conventional composite material.

In some embodiments, the fiber bundles in the MFSVS layers are arranged so that fiber bundles of one material are not placed next to one another and are instead placed next to fiber bundles of another material. For example, if the MFSVS layer is comprised of carbon fiber bundles and glass fiber bundles, they will be arranged so that the materials alternate as: carbon-glass-carbon-glass-carbon . . . etc. In other embodiments, the MFSVS layers are arranged so that fiber bundles of one material may be adjacent to either other fiber bundles of the same material or fiber bundles of another material. For example, if the fiber bundles are composed of carbon and aramid, they may be arranged as such: carbon-carbon-aramid-carbon-carbon-aramid . . . etc. In accordance with the present invention, there may be two aramid fiber bundles for every carbon fiber bundle, or other ratios such as three-to-one, four-to-one, etc. For example, if the fiber bundles are composed of carbon and glass, the fiber bundles in the MFSVS layer may be arranged as carbon-glass-glass-glass-carbon-carbon-glass-glass-glass-carbon- . . . etc.

The laminate stack of the invention dissipates energy by transferring energy received by the composite layers into deformations in the VEM layers.

In the present invention, the materials of the fiber bundles in the MFSVS layers have very different elastic properties, so that the dimension over which the tension-shear damping deformations are developed in the VEM layers is a function of the MFSVS's curvilinear fiber pattern, its reinforcing fiber properties, and the physical locations of the fiber bundles with different elastic properties in the MFSVS layer. In this manner, the local energy-dissipating deformations can be induced over a broader frequency and temperature range than in a laminate stack where the fiber bundles within an individual layer are not chosen to have specific, differing elastic properties.

The fiber bundles in the present invention are given their continuous periodic curved shape through a textile loom, a fiber or tow placement process, or other techniques or manufacturing methods known in the art of composite material manufacture.

In its simplest embodiment, a laminate stack of the invention is composed of three layers:

Layer 1: a composite layer of fiber bundles in a polymer matrix where all of the fiber bundles are made of the same material.

Layer 2: a composite layer of fiber bundles in a polymer matrix where the fiber bundles are made of two different materials with differing elastic properties and are arranged in a continuous curve (the MFSVS layer).

Layer 3: a layer made of VEM between the two aforesaid composite layers.

In a preferred, yet still simple, embodiment, the fiber bundles in Layer 1 are made of fiber bundles of the same material but are arranged in a continuous curve (this can be called a Spatially Varying Stiffness (SVS) composite layer). However, in accordance with the invention, this embodiment of the invention can be made of more than three layers. In some embodiments, the stack is made of alternating layers of composite and VEM. In other embodiments, the stack is made of several composite layers stacked on each other, then a layer of VEM, then more composite layers stacked on the VEM.

One aspect of the invention is an energy-absorbing structural laminate comprising:

a first composite layer comprising first layer fiber bundles of at least one type of reinforcing material bound with a polymer matrix, the fiber bundles being arranged side-by-side in a shape of a first continuous curve;

a second composite layer comprising second layer fiber bundles of at least two types of reinforcing material bound with a polymer matrix, the fiber bundles being arranged side-by-side in a shape of a second continuous curve; and a first dissipating layer positioned between the first composite layer and the second composite layer, the first dissipating layer being composed of viscoelastic material;

wherein the first continuous curve and the second continuous curve are out of phase with each other.

Another aspect of the invention is the laminate as described in any aspect above, further comprising:

a first reinforcing layer positioned over and adjacent to the first composite layer, the first reinforcing layer comprising first reinforcing layer fiber bundles bound with a polymer matrix; and a second reinforcing layer positioned under and adjacent to the second composite layer, the second reinforcing layer comprising second reinforcing layer fiber bundles bound with a polymer matrix.

Another aspect of the invention is the laminate stack as described in any aspect above, further comprising:

a second dissipating layer positioned between the first reinforcing layer and the first composite layer, the second dissipating layer being composed of viscoelastic material; and a third dissipating layer positioned between the second reinforcing layer and the second composite layer, the third dissipating layer being composed of viscoelastic material.

Another aspect of the invention is the laminate stack as described in any aspect above, wherein the material of the first composite layer fiber bundles is selected from the following types: metal, carbon, glass, ultra-high-molecular-weight polyethylene, polypropylene, and aramids. and wherein the materials of the second composite layer fiber bundles are selected from the following types: metal, carbon, glass, ultra-high-molecular-weight polyethylene, polypropylene, and aramids.

Another aspect of the invention is the laminate stack as described in any aspect above, wherein the materials of the second composite layer fiber bundles are carbon and poly-paraphenylene terephthalamide.

Another aspect of the invention is the laminate stack as described in any aspect above, wherein the materials of the second composite layer fiber bundles are carbon and glass.

Another aspect of the invention is the laminate stack as described in any aspect above, wherein the materials of the second composite layer fiber bundles are carbon and ultra-high-molecular-weight polyethylene.

Another aspect of the invention is the laminate stack as described in any aspect above, wherein the materials of the second composite layer fiber bundles are carbon and polypropylene.

Another aspect of the invention is the laminate stack as described in any aspect above, wherein the first continuous curve and the second continuous curve do not have the same propagation axis.

Another aspect of the invention is the laminate stack as described in any aspect above, wherein the viscoelastic material is selected from the following: urethane, rubber, and acrylic polymer.

Another aspect of the invention is the laminate stack as described in any aspect above, wherein the viscoelastic material is a blend of materials selected from the following: urethane, rubber, and acrylic polymer.

Another aspect of the invention is the laminate stack as described in any aspect above, wherein the first composite layer is composed of first layer fiber bundles of one type of material, and wherein the second composite layer is composed of second layer fiber bundles of two types of material.

Another aspect of the invention is the laminate stack as described in any aspect above, further comprising:
  at least one composite layer comprising composite layer fiber bundles of at least one type of material disposed within a polymer, the composite layer fiber bundles being arranged in a shape of a composite layer continuous curve; and at least one viscoelastic material layer.

Another aspect of the invention is the laminate stack as described in any aspect above, wherein the first continuous curve has the shape of a sine wave.

Another aspect of the invention is the laminate stack as described in any aspect above, wherein the second continuous curve has the shape of a sine wave.

Another aspect of the invention is the laminate stack as described in any aspect above, wherein at least one-quarter of the second layer fiber bundles are made of a first reinforcing material, and wherein at least one-quarter of the second layer fiber bundles are composed of a second reinforcing material.

Another aspect of the invention is the laminate stack as described in any aspect above, wherein one-quarter of the second layer fiber bundles are made of a first reinforcing material, and wherein three-quarters of the second layer fiber bundles are composed of a second reinforcing material.

Another aspect of the invention is the laminate stack as described in any aspect above, wherein one-third of the second layer fiber bundles are made of a first reinforcing material, and wherein two-thirds of the second layer fiber bundles are composed of a second reinforcing material.

Another aspect of the invention is the laminate stack as described in any aspect above, wherein half of the second layer fiber bundles are made of a first reinforcing material, and wherein half of the second layer fiber bundles are composed of a second reinforcing material.

Another aspect of the invention is the laminate stack as described in any aspect above, wherein each fiber bundle of a first reinforcing material is positioned next to a fiber bundle of a second reinforcing material, wherein no fiber bundle of the first reinforcing material is positioned next to other fiber bundles of the first reinforcing material, and no fiber bundle of the second reinforcing material is positioned next to other fiber bundles of the second reinforcing material.

DETAILED DESCRIPTION OF THE INVENTION

Definitions for the purposes of this application:

Fiber bundle—Due to their small size (2 to 30 micron), individual fibers or filamentary materials (carbon, glass, aramid, etc.) referred to in this patent application are typically grouped or bundled together to facilitate fabrication of composite materials. In the composites industry, an untwisted bundle of continuous filaments is termed a "tow" or "roving", and a group of filaments or fibers that are twisted as they are bundled are generally termed "yarns." Tows, rovings, and yarns are all capable of being used in the present invention. Moreover, as a matter of convenience for nomenclature, the term "fiber bundle" as used herein also refers to a single filament or fiber. Thus, a reference herein to a "fiber bundle" is to a tow, a roving, a yarn, or a single fiber, unless clearly excluded by the context. Typically, all filaments in a given fiber bundle are of the same material.

Composite material—A composite material is made of fiber bundles bound together in a polymer. The composite material, or layer, is a generally planar sheet, with the fiber bundles positioned using a textile loom, a fiber or tow placement process, or other techniques known in the art of composite material manufacture. The fibers are bound with a polymer that is allowed to set, creating a single material that has different characteristics than only the fibers or only the polymer.

Viscoelastic material (VEM)—A material that is viscoelastic exhibits both viscous and elastic characteristics when undergoing deformation. Viscous materials resist shear flow and strain with time when a stress is applied. Elastic materials strain when stretched and quickly return to their original state once the stress is removed. Viscoelastic materials have elements of both of these properties, exhibiting time-dependent strain. Examples of VEMs suitable for use in the present invention are urethane, rubber, acrylic polymer, or a blend of any of these.

Laminate stack—A laminate stack is an assembly of substantially parallel layers of materials joined to provide some desired properties. Laminate stacks are conventionally formed of layers of fibrous composite materials, but a laminate stack of the present invention is formed of layers of composite materials and VEMs. The desired property is dissipation of vibration energy and noise.

Continuous curve—This is a curve defined by a single non-straight line. Sine waves and parabolas are examples of continuous curves.

Out of phase—In many of the different composite material layers of this invention, the fibers are formed in a continuous curve. If curves have the same shape, their composite material layers can be laid on one another so that a line drawn vertically through a stack of layers would touch a different portion of the curve in different layers. For example, the vertical line might touch the trough of a sine wave in the top layer and the crest, node, or intermediate position of a sine wave in the bottom layer. In another example, the vertical line might touch the vertex of a parabola in the top layer and a different part of the parabola in the bottom layer. In this patent application, "out of phase" refers to any stacking of similarly-shaped layers that fulfills this vertical line property. As used in this patent application, "out of phase" may also apply to curve shapes that are not waves.

Propagation axis—The propagation axis in a composite layer is the general direction from one end of an individual fiber bundle to its other end. This should not be confused with the "fiber axis," which in continuous curves will vary depending on the particular point of the fiber being referenced.

Highly orthotropic—When bound with a polymer, reinforcing fibers or filaments such as carbon, aramids, and other anisotropic fibers produce composite material elasticity properties that are very different along their fiber axis versus perpendicular to it. In this patent application, "highly orthotropic" refers to the property of composite layers constructed of fiber bundles where the ratio of the elastic stiffness in the direction of long fiber axis (E1) to the elastic stiffness perpendicular to the axis (E2), is large, typically greater than five (E1/E2>5).

The Figures in the present patent application illustrate the inventive concept in diagrammatic form rather than as literal depictions of embodiments of the invention. In the Figures, the various layers of the stack are represented as planar rectangles for purpose of illustration. In use, the shape of the layers, and the stack itself, depends on the design characteristics of the structure into which the invention is being incorporated. The borders of the layers and stack may be triangular, circular, oval, hexagonal, or any other regular shape, or may even be irregular, as the design characteristics of the structure may dictate.

The waves of fiber bundles are shown partially, with the ends truncated for purpose of illustration. The reader should understand that the fibers desirably extend to the intended border of the layer, unless the design characteristics of the product dictate otherwise.

The drawings present an exploded view, so that the structure of the layers themselves and their relationship to one another can be more clearly appreciated. In practice, the layers are laid atop one another into a stack and bonded together. Typically the layers are opaque rather than translucent.

Figure 1:
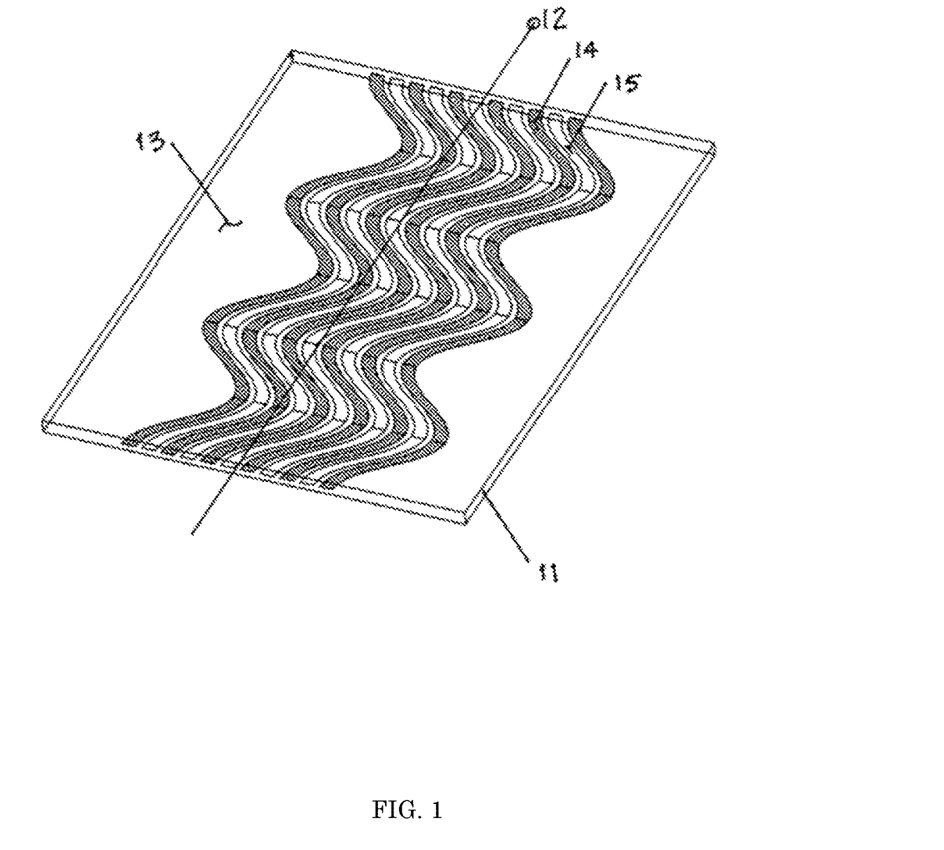
FIG. 1 is a diagrammatic representation showing a perspective view of a composite layer of the invention, showing the wave patterns of the fibers.

In the laminate stack, the composite layers 11 are composed of fiber bundles 14, 15 which have differing elasticity properties within a polymer 13. As illustrated by FIG. 1, the fiber bundles 14, 15 are positioned substantially parallel to one another and are shaped to have a continuous curve. In preferred embodiments, the fiber curves are periodic functions, e.g., sinusoidal functions or functions comprising sequential circular arcs alternately concave and convex with respect to the propagation axis 12.

Due to the continuous curve, the fibers 14, 15 orientation is continuously variable. Thus, when the MFSVS layer undergoes tensile or compressive forces introduced by oscillatory motions, continuity of deformations between the layers in the laminate stack and the continuously varying elastic properties that exist within the MFSVS layers cause shearing strains to be generated throughout the VEM layer rather than just at its edges. The magnitude and pattern of the shear stresses in the VEM, and thus the amount of damping, is defined by the magnitude of the elasticity difference of the various fibers in the MFSVS layer, the properties of the other layers in the laminate stack, and the shape of the continuous curve in the MFSVS layer.

Figure 2:
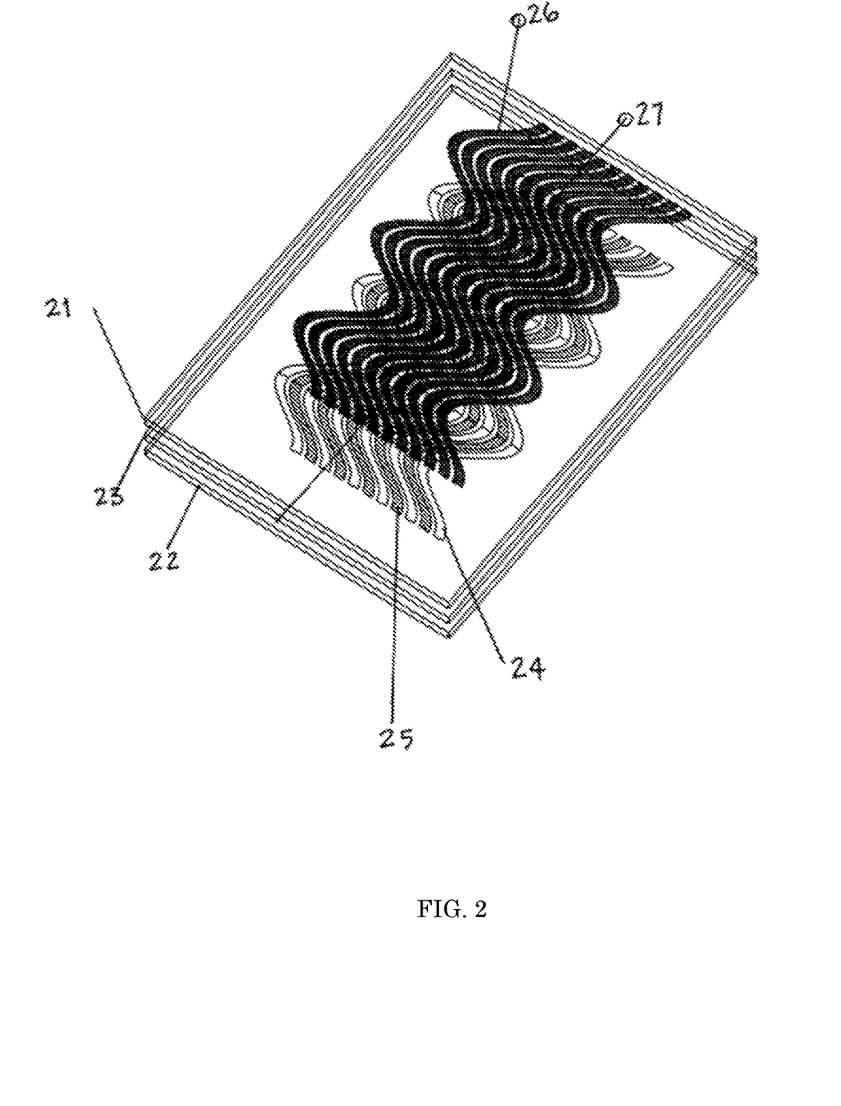
FIG. 2 is a diagrammatic representation showing a perspective exploded view of a 3-layer embodiment of the invention, showing the waves of the fibers out of phase from one composite layer to the other.

FIG. 2 illustrates the simplest embodiment of the invention. There is a first composite layer 21, a second composite layer 22, and a layer of viscoelastic material 23. Each composite layer 21, 22 has reinforcing fibers. The fiber bundles 24, 25 in the first composite layer 21 are oriented so that their continuous curve is out of phase along the propagation axis 27 with the continuous curves of the fiber bundles 26 of the second composite layer 22. In embodiments with more than two composite layers, the curve of the fibers of at least one composite layer is out of phase with the curve of fibers of at least some of the other composite layers; in accordance with the invention, embodiments could be constructed so that the fibers of each of the composite layers are out of phase with one another. Note that FIG. 2 shows an exploded view for purposes of illustration; in use, the layers are bonded together, allowing the composite layers 21, 22 to transfer energy to the VEM layer 23. Note also that the fiber bundles 24, 25, 26 are truncated for purposes of illustration. In use, the fibers 24, 25, 26 desirably extend through the entire layer.

Figure 3:
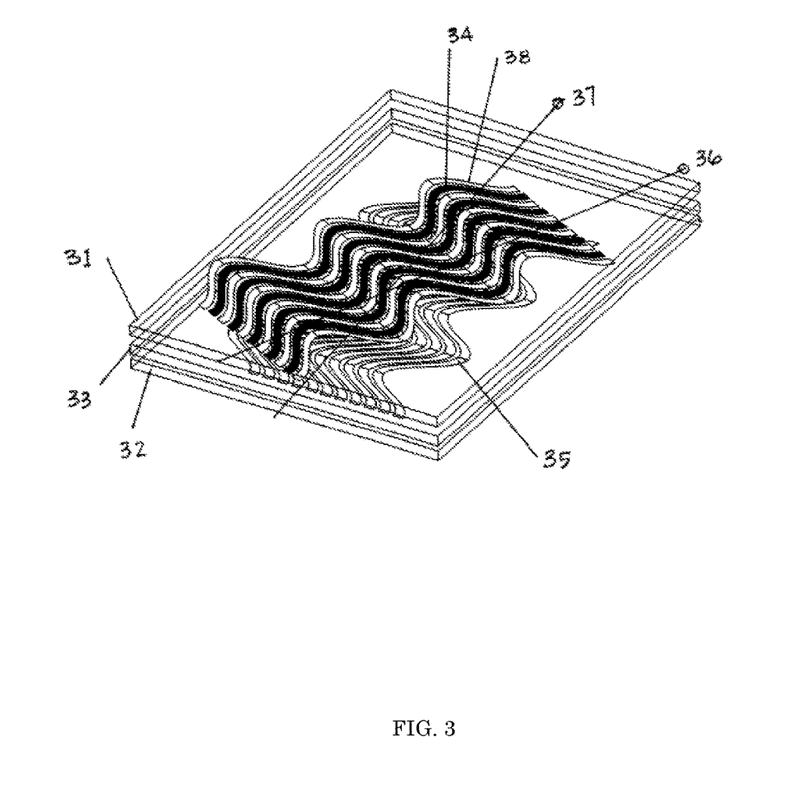
FIG. 3 is a diagrammatic representation showing a perspective exploded view of another 3-layer embodiment of the invention, showing the waves of the fibers out of phase and with different propagation axes from one composite layer to the other.

As illustrated by FIG. 3, in alternative but still simple embodiments, the fiber bundles 34, 38 in the first composite layer 31 have a continuous curve that is not only out of phase with the fiber bundles 35 in the second layer 32, but the curve in the first composite layer 31 has a propagation axis 36 in a different direction than the direction of the propagation axis 37 of the curve in the second composite layer 32. As in the embodiment of FIG. 2, the composite layers 31, 32 are separated by a layer of viscoelastic material 33.

In embodiments with more than two composite layers, the curve of the fibers of at least one composite layer may have a different propagation axis than the curves of the fibers of the other composite layers; in accordance with the invention, the invention can be constructed so that the curves of the fibers of all the composite layers have different directions of propagation. Note that, like FIG. 2, FIG. 3 shows an exploded view for purposes of illustration; in use, the layers are bonded together, allowing the composite layers 31, 32 to transfer energy to the VEM layer 33. Note also that the fiber bundles 34, 35, 38 are truncated for purposes of illustration. In use, the fibers 34, 35, 38 desirably extend through the entire layer.

As shown in FIG. 1, FIG. 2, and FIG. 3, in at least one composite layer of the product, the fibers of the layer are not all made of the same material. The materials of the fibers are chosen to have differing elasticity properties. Due to this innovation, the dimension over which the tension-shear damping deformations are developed in the VEM is a function of the curvilinear fiber pattern, the reinforcing properties of the fibers themselves, and the physical locations in the composite layer of the fibers with different elastic properties. Due to this, the local energy-dissipating deformations in the VEM layer located between the composite layers can be induced over a broader frequency and temperature range than by a laminate stack where the composite layer fibers have the same (or very similar) elastic properties.

In the composite layers, including the MFSVS layers, the polymer is selected from the general categories of thermoset or thermoplastic materials, such as epoxy or PEEK (polyetheretherketone). The fiber bundles can be made from carbon, glass, metal, or aramid, including polyparaphenylene terephthalamide (currently sold under the trademark KEVLAR®), ultra-high-molecular-weight polyethylene (currently sold under the trademarks SPECTRA® or DYNEEMA®), or polypropylene. In some embodiments of the MFSVS layer, the fiber bundles are made of carbon and polyp araphenylene terephthalamide. In other embodiments of the MFSVS layer, the fiber bundles are made of carbon and glass, carbon and UHMWPE, carbon and polypropylene, or glass and polypropylene Typically, the composite layers have a thickness from 0.002 inches to 0.030 inches.

In each composite layer of the invention, the fibers and their arrangement are chosen to deliver the highest damping properties in the frequency and temperature range of interest for the specific structural configuration. In preferred embodiments, highly orthotropic fibers are arranged next to lesser orthotropic fibers because the fibers chosen and the number of like fiber bundles side-by-side each influence the spatially varying stiffness properties of the composite layer. A MFSVS layer comprised of fiber bundles that are more orthotropic and dissimilar elastically, arranged in a one-by-one alternating pattern, will have greater damping at higher frequencies than lesser orthotropic fiber bundles in the same arrangement. For example, a one-by-one alternating pattern of carbon (E1/E2≈15) and glass (E1/E2≈4) would have greater dampening at higher frequencies than KEVLAR (E1/E2≈7) and glass. However, both the KEVLAR-glass and carbon-glass arrangements have greater damping properties than a composite layer composed of fibers of just one material. For MFSVS layers where one-by-one alternating fiber bundles are not used, the laminate stack will have greater damping in a lower frequency range. For example, a two-one-two-one arrangement will have greater damping in a lower frequency range than a one-by-one arrangement, a three-one-three-one arrangement will have greater damping in a lower frequency range than a two-one-two-one arrangement, and so on. As more fiber bundles of the same material are arranged next to one another in the MFSVS layer, the frequency range at which greatest damping occurs lowers further.

The VEM can be made of urethane, rubber, acrylic polymer, or a blend of any of these. The VEM layers are typically 0.001 inches to 0.060 inches thick, or approximately one-half to two times the thickness of the composite layers.

Returning to FIG. 2, the fiber bundles 24, 25 in the first composite layer 21 are made of more than one material; the first composite layer 21 is an MFSVS layer. The fiber bundles 26 of the second composite layer 22 are made of one material. In some embodiments, the second composite layer is also an MFSVS layer.

Returning to FIG. 3, the fiber bundles 34, 38 in the first composite layer 31 are made of more than one material; the first composite layer 31 is an MFSVS layer. The fiber bundles 35 of the second composite layer 32 are made of one material. In some embodiments, the second composite layer is also an MFSVS layer.

In still other embodiments, there are more than two composite layers. The additional composite layers alternate with additional VEM layers, as in the three-layer stack. For example, a seven-layer stack of this embodiment would be constructed from bottom to top as composite layer-VEM layer-composite layer-VEM layer-composite layer-VEM layer-composite layer. As in previously-described embodiments, at least one of the composite layers is a MFSVS layer, in which the fiber bundles are made of different materials with differing elasticity properties. In some of these embodiments, each composite layer is an MFSVS layer.

In yet still other embodiments, there are more than two composite layers. A number of different composite layers are stacked on one another with no VEM layer between. In turn, the stacks of composite layers are separated from one another by at least one VEM layer. As in previously-described embodiments, at least one of the composite layers is an MFSVS layer, in which the fiber bundles are made of different materials with differing elasticity properties. In some of these embodiments, each composite layer is an MFSVS layer.

Figure 4:
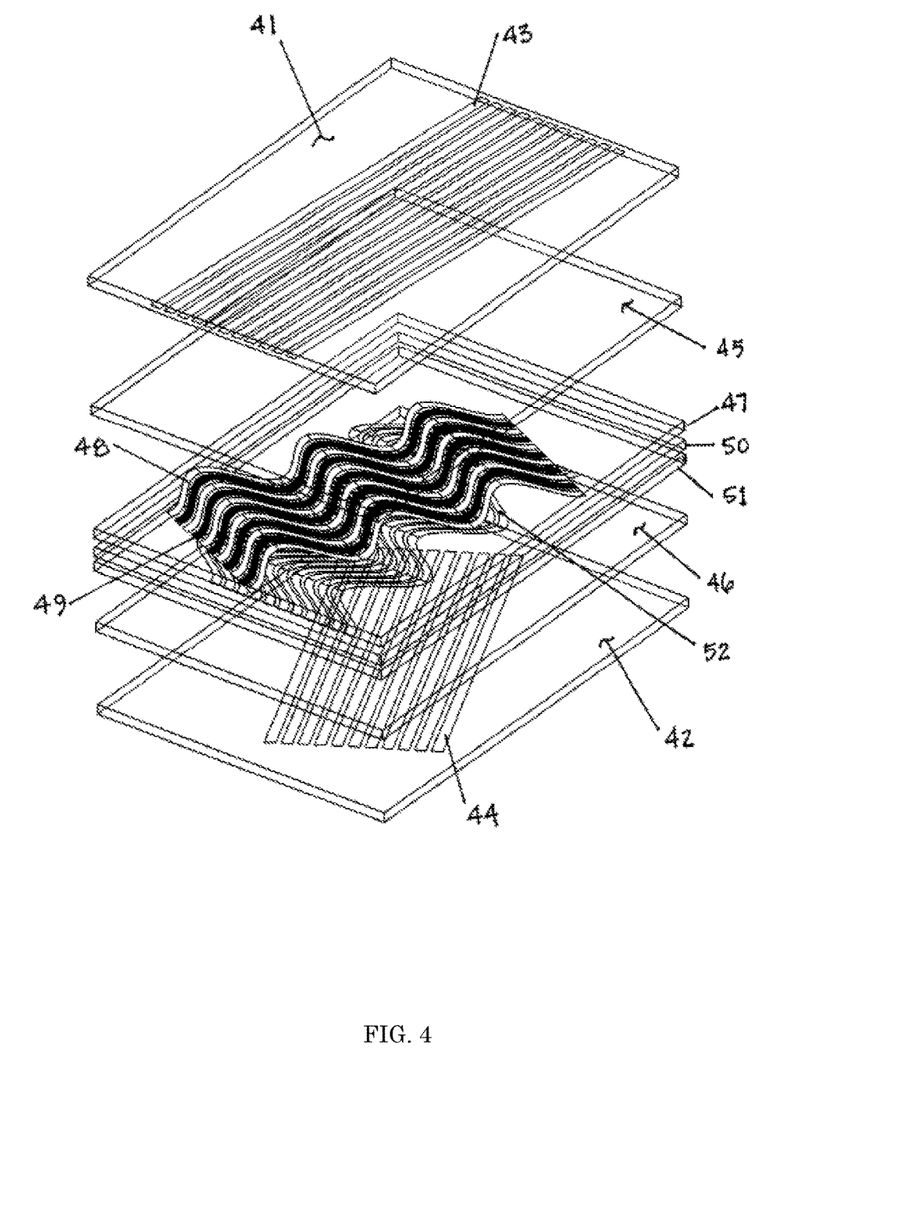
FIG. 4 is a diagrammatic representation showing a perspective exploded view of yet another embodiment of the invention.

FIG. 4 illustrates a particular embodiment of the invention. The top layer 41 and bottom layer 42 are both made of reinforcing fiber bundles 43, 44 within a polymer. However, these reinforcing fiber bundles 43, 44 are not curved. FIG. 4 shows a VEM layer 45 just below the top layer 41 and a VEM layer 46 just above the bottom layer 42. These two VEM layers 45, 46 are optional. FIG. 4 also illustrates a first composite layer 47 with fiber bundles 48, 49 of different materials in a continuous curve (an MFSVS layer), a VEM layer 50, and a second composite layer 51 with fiber bundles in a continuous curve. The curve of the fiber bundles 52 of the second composite layer 51 may be out of phase with the curve of the fiber bundles 48, 49 of the first composite layer 47. Additionally, the curve of the fiber bundles 52 of the second composite layer 51 may have a different propagation axis than the curve of the fiber bundles 48, 49 of the first composite layer 47. As in FIGS. 2 and 3, FIG. 4 shows an exploded view for purposes of illustration; in use, the layers touch, allowing composite layers to transfer energy to the VEM layer(s).

The laminate stack can be used in any geometric form consistent with its layered structure. Without limiting its possible uses, some examples of its use include flat sheets, tubes, domes, beams, and stiffened and unstiffened shells. The composite layers may be assembled using any process compatible with the polymer matrix. In general these processes require a combination of heat and pressure to cure the polymer and bond the layers together, with details depending on the specifics of the polymer chosen. These processes are known to those skilled in the art broadly as molding or laminating methods, and more specifically sometimes referred to as autoclaving, oven-vacuum bagging, wet layup, resin infusion, or fiber placement. The lamination process choice depends more on the size, shape, and type of structure being produced rather than the laminate stack itself.

We claim:

1. An energy-absorbing laminate stack comprising:
a first composite layer comprising first fiber bundles of reinforcing fiber, the first fiber bundles being bound with a polymer matrix, being arranged side-by-side in a shape of a first continuous curve, and having orthotropic stiffness;
a second composite layer comprising second fiber bundles of reinforcing fiber, the second fiber bundles being bound with a polymer matrix and arranged side-by-side in a shape of a second continuous curve, the second fiber bundles including
a first type of reinforcing fiber bundles, being bundles of carbon fiber that have orthotropic stiffness, and
a second type of reinforcing fiber bundles, being bundles of a second type of reinforcing fiber that have orthotropic stiffness, the second type of reinforcing fiber being glass fiber or aramid fiber,
wherein one type of reinforcing fiber bundles among the first and second types of reinforcing fiber bundles are alternating with another type of reinforcing fiber bundles among the first and second types of reinforcing fiber bundles in a one-by-one arrangement, two-one-two-one arrangement, or three-one-three-one arrangement in the second composite layer; and
a dissipating layer of viscoelastic material, positioned between the first composite layer and the second composite layer,
wherein the first continuous curve and the second continuous curve are out of phase with each other.

2. The laminate stack of claim 1, wherein substantially all fibers in the first fiber bundles are composed of the same material.

3. The laminate stack of claim 2, further comprising:
a first reinforcing layer positioned over and adjacent to the first composite layer, the first reinforcing layer comprising first reinforcing layer fiber bundles bound with a polymer matrix; and
a second reinforcing layer positioned under and adjacent to the second composite layer, the second reinforcing layer comprising second reinforcing layer fiber bundles bound with a polymer matrix.

4. The laminate stack of claim 3, wherein the dissipating layer is a first dissipating layer, and the laminate stack further comprises:
a second dissipating layer of viscoelastic material, positioned between the first reinforcing layer and the first composite layer; and
a third dissipating layer of viscoelastic material, positioned between the second reinforcing layer and the second composite layer.

5. The laminate stack of claim 2, wherein the first continuous curve and the second continuous curve do not have the same propagation axis.

6. The laminate stack of claim 2, wherein the viscoelastic material is selected from the following: urethane, rubber, and acrylic polymer.

7. The laminate stack of claim 2, wherein the viscoelastic material is a blend of materials selected from the following: urethane, rubber, and acrylic polymer.

8. The laminate stack of claim 2, further comprising:
at least one further composite layer comprising fiber bundles, of reinforcing fiber, bound with a polymer matrix and arranged in a shape of a composite layer continuous curve; and
at least one further layer of viscoelastic material layer.

9. The laminate stack of claim 1, wherein the first fiber bundles are bundles of at least one type of reinforcing fiber selected from: metal fiber, carbon fiber, glass fiber, ultra-high-molecular-weight polyethylene fiber, polypropylene fiber, and aramid fiber.

10. The laminate stack of claim 1, wherein the second type of reinforcing fiber.

11. The laminate stack of claim 10, wherein the aramid fiber is polyparaphenylene terephthalamide fiber.

12. The laminate stack of claim 1, wherein the second type of reinforcing fiber is the glass fiber.

13. The laminate stack of claim 1, wherein the first continuous curve has a shape of a sine wave.

14. The laminate stack of claim 1, wherein the second continuous curve has a shape of a sine wave.

15. The laminate stack of claim 1, wherein
at least one-quarter of the second fiber bundles are of the first type of reinforcing fiber bundles, and
at least one-quarter of the second fiber bundles are of the second type of reinforcing fiber bundles.

16. The laminate stack of claim 15, wherein
one-quarter of the second fiber bundles are of the first type of reinforcing fiber bundles, and
three-quarters of the second fiber bundles are of the second type of reinforcing fiber bundles.

17. The laminate stack of claim 15, wherein
one-third of the second fiber bundles are of the first type of reinforcing fiber bundles, and
two-thirds of the second fiber bundles are of the second type of reinforcing fiber bundles.

18. The laminate stack of claim 15, wherein
half of the second fiber bundles are of the first type of reinforcing fiber bundles, and
half of the second fiber bundles are of the second type of reinforcing fiber bundles.

19. The laminate stack of claim 1, wherein the first type of reinforcing fiber bundles are alternating with the second type of reinforcing fiber bundles in the one-by-one arrangement in the second composite layer, so that:
no fiber bundle among the first type of reinforcing fiber bundles is positioned directly adjacent to another fiber bundle among the first type of reinforcing fiber bundles, and
no fiber bundle among the second type of reinforcing fiber bundles is positioned directly adjacent to another fiber bundle among the second type of reinforcing fiber bundles.

* * * * *